United States Patent
Reed et al.

(10) Patent No.: US 10,487,478 B2
(45) Date of Patent: Nov. 26, 2019

(54) WIRELESS SYSTEM AND METHOD FOR CONNECTED WORK TOOL IDENTIFICATION

(71) Applicant: Caterpillar Inc., Peoria, IL (US)

(72) Inventors: Joshua Dean Reed, Galesburg, IL (US); Arjun Veneshetty, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 134 days.

(21) Appl. No.: 15/782,127

(22) Filed: Oct. 12, 2017

(65) Prior Publication Data

US 2019/0112792 A1    Apr. 18, 2019

(51) Int. Cl.
| | | |
|---|---|---|
| *E02F 9/26* | (2006.01) | |
| *H04W 4/80* | (2018.01) | |
| *E02F 3/43* | (2006.01) | |
| *E02F 9/20* | (2006.01) | |
| *H04W 4/30* | (2018.01) | |

(52) U.S. Cl.
CPC ............ *E02F 9/265* (2013.01); *E02F 3/437* (2013.01); *E02F 9/2029* (2013.01); *H04W 4/80* (2018.02); *H04W 4/30* (2018.02)

(58) Field of Classification Search
CPC ......... G06F 19/00; G06F 15/00; A01B 67/00; A01B 63/00; E02F 9/265; E02F 3/437; E02F 9/2029; E02F 9/26; E02F 3/43; E02F 9/20; H04W 4/80; H04W 4/30
See application file for complete search history.

(56) References Cited

U.S. PATENT DOCUMENTS

| | | |
|---|---|---|
| 6,542,789 B2 | 4/2003 | Ufheil |
| 7,099,722 B2 * | 8/2006 | Casey ............. E02F 3/96 700/188 |
| 7,856,301 B2 | 12/2010 | Sjogren |
| 7,890,235 B2 | 2/2011 | Self |
| 8,401,744 B2 | 3/2013 | Daniel |
| 8,502,674 B1 | 8/2013 | Cole |
| 8,521,371 B2 | 8/2013 | Faivre |
| D723,957 S | 3/2015 | Evans |
| 9,180,889 B2 | 11/2015 | Upchurch |
| D748,507 S | 2/2016 | Evans |
| D766,713 S | 3/2016 | Kiss |
| 9,299,019 B2 | 3/2016 | Rasmussen |
| 9,334,627 B2 | 5/2016 | Self |
| 9,357,348 B2 | 5/2016 | Evans |

(Continued)

FOREIGN PATENT DOCUMENTS

| | | |
|---|---|---|
| DE | 102011002712 | 7/2012 |
| WO | WO2009146009 | 12/2009 |

(Continued)

*Primary Examiner* — Yonel Beaulieu
*Assistant Examiner* — Martin A Weeks (57) ABSTRACT

A short-range wireless device includes a short-range data transmission component transmitting data at a first signal strength. A movement detection device provides an indication that a work tool supporting the short-range wireless device is in a coupled configuration with a machine, or is intended to be coupled with the machine. A processor reduces the first signal strength to a second signal strength in response to the indication. The short-range data transmission component then transmits data at the second signal strength.

20 Claims, 8 Drawing Sheets

(56) References Cited

U.S. PATENT DOCUMENTS

| | | |
|---|---|---|
| 9,479,920 B1 | 10/2016 | Mayor |
| 9,699,612 B2 | 7/2017 | Evans |
| 2006/0019693 A1* | 1/2006 | Kopetzky ............ H04W 36/16 |
| | | 455/522 |
| 2009/0036104 A1 | 2/2009 | Malik |
| 2010/0178913 A1 | 7/2010 | Herbert |
| 2010/0283600 A1 | 11/2010 | Herbert |
| 2014/0073262 A1 | 3/2014 | Gutierrez et al. |
| 2014/0078868 A1 | 3/2014 | McCaskill, III |
| 2014/0297900 A1 | 10/2014 | Herbert |
| 2015/0243158 A1 | 8/2015 | Eskenazi |
| 2015/0300165 A1 | 10/2015 | Marsolek |
| 2015/0362581 A1 | 12/2015 | Friedman |
| 2016/0088482 A1* | 3/2016 | Zeiler ................... H04W 4/029 |
| | | 455/426.1 |
| 2016/0105764 A1 | 4/2016 | Evans |
| 2016/0105765 A1 | 4/2016 | Farley |
| 2016/0105766 A1 | 4/2016 | de la Broise |
| 2016/0116906 A1* | 4/2016 | Grivetti ............ G05B 19/40938 |
| | | 700/180 |
| 2016/0277884 A1* | 9/2016 | Ehrman ................ G06Q 10/08 |
| 2017/0371322 A1* | 12/2017 | Lake ....................... H04W 4/50 |

FOREIGN PATENT DOCUMENTS

| | | |
|---|---|---|
| WO | WO2016057678 | 4/2016 |
| WO | WO2016115499 | 7/2016 |

* cited by examiner

WIRELESS SYSTEM AND METHOD FOR CONNECTED WORK TOOL IDENTIFICATION

TECHNICAL FIELD

The present disclosure relates generally to machine work tools and, more particularly, to a wireless system and method for identifying a connected work tool of a machine.

BACKGROUND

Work machines, such as loaders, excavators, and the like, typically have a large number of hydraulically controlled work tools or attachments that may be attached to, or coupled with, the work machines to assist in performing a particular work function. The work tools or attachments are usually controlled through an implement control system, which typically includes one or more hydraulic systems used to actuate and control the implement lift and/or tilt mechanisms. Since each unique work tool requires different parameters and control functions, multiple machine systems may require reconfiguration when a different work tool is attached to a machine.

U.S. Pat. No. 7,099,722 to Casey discloses a work machine attachment control system. The control system has an operator input device configured to control a movement speed of the work machine. The control system also has a tool recognition device configured to generate a signal corresponding to each of the removably attachable work tools and a controller in communication with the operator input device and the tool recognition device. The controller is configured to change a ratio of a work machine movement speed to actuation position of the input device in response to the signal.

SUMMARY OF THE INVENTION

In one aspect, a short-range wireless device comprises a short-range data transmission component transmitting data at a first signal strength. A movement detection device provides an indication that a work tool supporting the short-range wireless device is in a coupled configuration with a machine. A processor reduces the first signal strength to a second signal strength in response to the indication. The short-range data transmission component then transmits data at the second signal strength.

In another aspect, a short-range wireless system comprises a short-range wireless device of a work tool configured to transmit data at a first signal strength, receive an indication that the work tool is in a coupled configuration with a machine, transmit data at a second signal strength in response to the indication, and set an active flag in the data transmitted at the second signal strength. The short-range wireless system also includes a short-range wireless scanner located at a machine, configured to detect short-range wireless devices in a surrounding area, detect the active flag in the data transmitted at the second signal strength, and identify the work tool as a connected work tool based in part on the active flag.

In yet another aspect, a method for connected work tool identification includes a step of transmitting data from a plurality of short-range wireless devices at a first signal strength, with each of the plurality of short-range wireless devices supported on one of a plurality of work tools. The method also includes receiving an indication at a first short-range wireless device of the plurality of short-range wireless devices that a first work tool supporting the first short-range wireless device is in a coupled configuration with a machine, transmitting data from the first short-range wireless device at a second signal strength in response to the indication, and setting an active flag in the data transmitted at the second signal strength from the first short-range wireless device in response to the indication. Additionally, the method includes detecting short-range wireless devices in a surrounding area using a short-range wireless scanner located at the machine, detecting the active flag in the data transmitted at the second signal strength using the short-range wireless scanner, and identifying the first work tool as a connected work tool of the machine based in part on the active flag.

Other features and aspects will be apparent from the following description and accompanying drawings.

DETAILED DESCRIPTION

Reference will now be made in detail to specific embodiments or features, examples of which are illustrated in the accompanying drawings. Wherever possible, corresponding or similar reference numerals will be used throughout the disclosure and accompanying drawings to refer to the same or corresponding parts.

Figure 1:
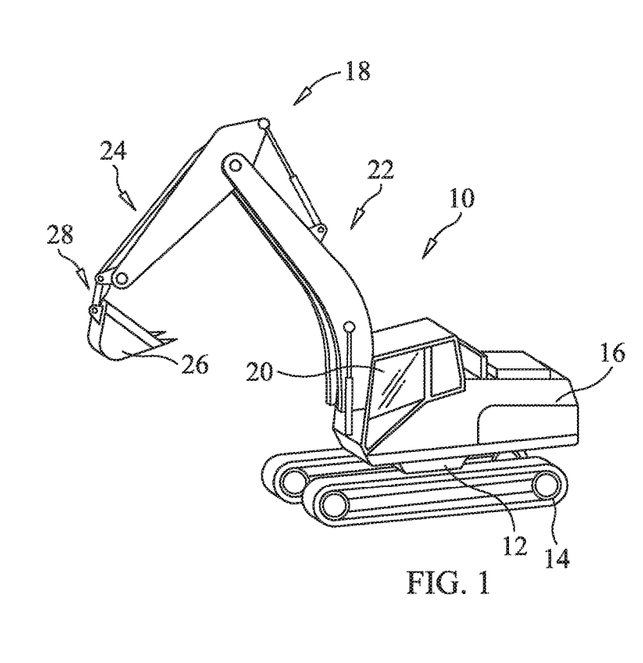
FIG. 1 is a side perspective view of a machine, including a work tool in a coupled configuration, according to the present disclosure.

An exemplary embodiment of a machine 10 is shown in FIG. 1. The machine 10 may be an excavator, as shown, or any other off-highway machine or on-highway machine. The exemplary machine 10 includes a frame 12 supporting ground-engaging elements 14 and a machine body 16. An engine (not shown), or other power source, is also supported on the frame 12 for powering at least the ground-engaging elements 14 and an implement assembly 18. The machine 10 also includes an operator control station 20 housing various controls for facilitating control of systems and components of the machine 10, including, for example, the ground-engaging elements 14 and the implement assembly 18.

Figure 2:
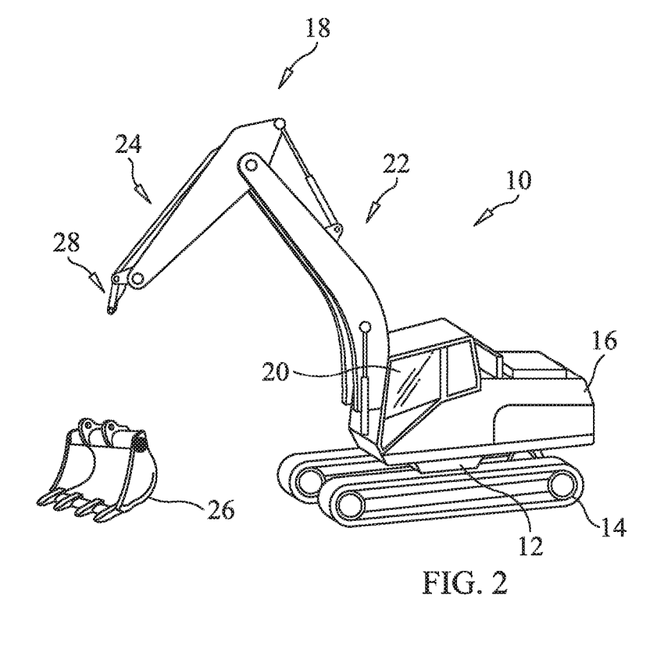
FIG. 2 is a side perspective view of the machine of FIG. 1, shown with the work tool in a decoupled configuration.

The implement assembly 18, which is provided for exemplary purposes, generally comprises a lift arm assembly 22, a tilt linkage 24, and a work tool 26. The lift arm assembly 22 may be pivotably attached to the frame 12, while the tilt linkage 24 may be pivotably attached to the lift arm assembly 22. Although the work tool 26 is illustrated as a bucket, the machine 10 may support any of a variety of different work tools, such as, for example, blades, forks, and the like for performing various work operations. According to some embodiments, the machine 10 may include a quick coupler 28, or other similar mechanism supported by the implement assembly 18, which provides a means for coupling a variety of interchangeable work tools, including work tool 26, to the machine 10. For example, the work tool 26 is shown in a coupled configuration relative to the machine 10 in FIG. 1, while the work tool 26 is shown in a decoupled configuration relative to the machine 10 in FIG. 2.

Figures 3, 4, 5:
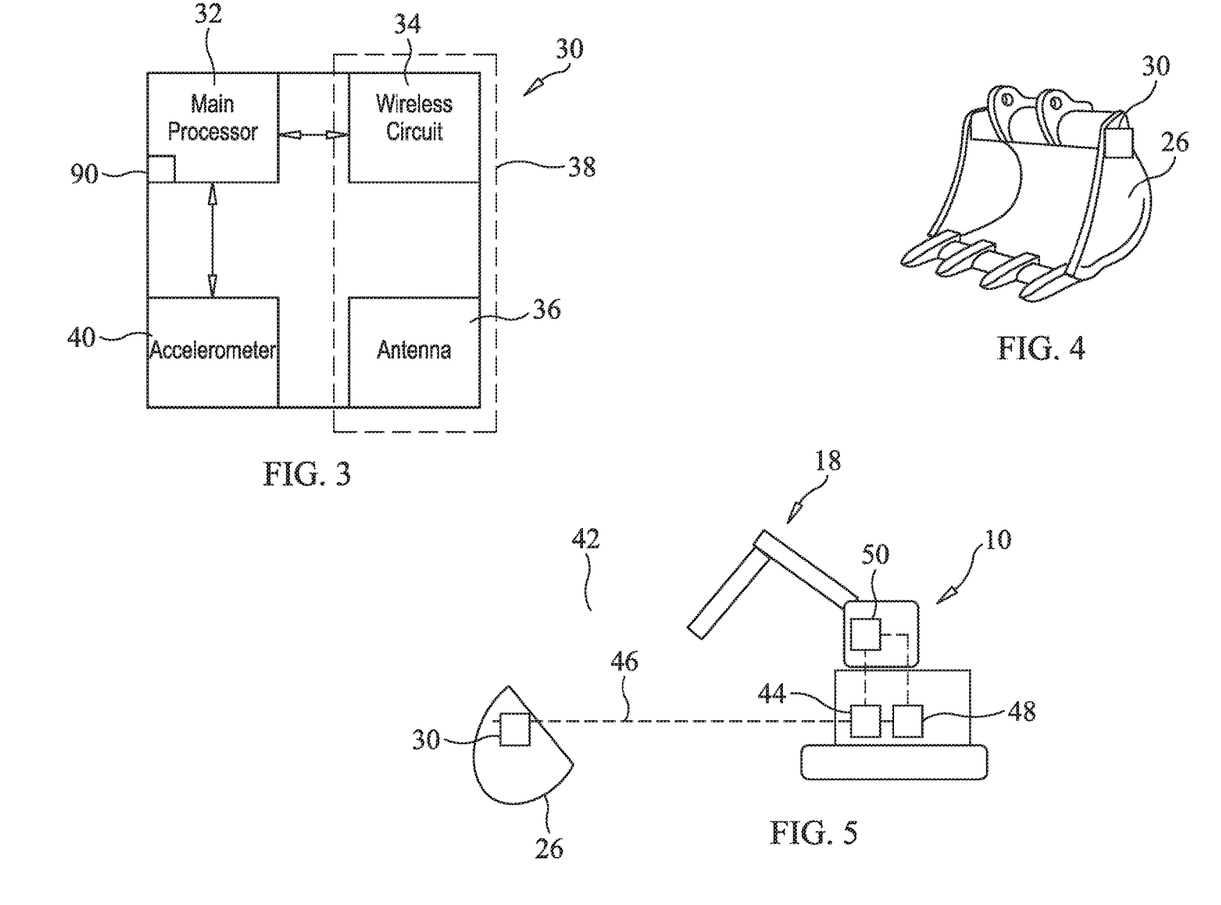
FIG. 3 is a block diagram of a short-range wireless device, according to the present disclosure.
FIG. 4 is a perspective view of the work tool of FIGS. 1 and 2, having the short-range wireless device of FIG. 3 coupled thereto.
FIG. 5 is a schematic view of the machine and work tool of the previous FIGS. and a short-range wireless system for connected work tool identification, according to the present disclosure.

The work tool 26 may support a short-range wireless device 30, shown in FIG. 3, for connected work tool identification. A battery, or other power source, may power the short-range wireless device 30. According to the exemplary embodiment, the short-range wireless device 30 may include a processor 32 for processing instructions that control operation of the short-range wireless device 30. The short-range wireless device 30 may include a wireless technology circuit 34, such as, for example, a Bluetooth circuit, for providing short-range wireless communications over a cellular network. An internal antenna 36 may be used to transmit device information and/or receive information using wireless technology. A short-range data transmission component 38 of the short-range wireless device 30, which may include the wireless technology circuit 34 and the internal antenna 36, may have a broadcast range of about 0-230 feet, or longer, for example. "Short-range" may refer to the broadcast range of applicable components or devices described herein. The utilization of short-range wireless communications may conserve energy, which may be useful in applications where it is difficult to charge or replace the battery.

The short-range wireless device 30 may also include a movement detection device 40, such as an accelerometer, measuring acceleration forces. Additionally, or alternatively, the short-range wireless device 30 may include a gyro sensor, barometer, or other device for detecting movement. All of the components of the short-range wireless device 30 may be packaged in a durable housing to protect the components when the short-range wireless device 30 is used in rugged terrain.

When the short-range wireless device 30 is supported on, or coupled with, the work tool 26, as shown in FIG. 4, the movement detection device 40 may provide an indication that the work tool 26 is in a coupled configuration with the machine 10. For example, the movement detection device 40 may detect acceleration that occurs when the work tool 26 is picked up by the machine 10. This information may be transmitted to the machine 10 and used for connected work tool identification, as described below.

FIG. 5 illustrates both the work tool 26, having the short-range wireless device 30 supported thereon, and the exemplary machine 10. The short-range wireless device 30 may be part of a short-range wireless system 42 for connected work tool identification. In addition to the short-range wireless device 30, the short-range wireless system 42 may also include a short-range wireless scanner 44 of the machine 10. The short-range wireless scanner 44, which may be a Bluetooth scanner, may be configured to scan for and/or detect short-range wireless devices, such as the short-range wireless device 30, in a surrounding area, which includes a broadcast area of the short-range wireless devices. In addition, the short-range wireless scanner 44, which may be located at the machine 10, may communicate with one or more of a controller 48 and an operator display 50 on the machine 10, as will be described below. According to some embodiments, the controller 48 may include a processing component and a data storage component, with the processing component configured to execute computer readable program code, which may be stored using the data storage component.

In general, the short-range data transmission component 38 of the short-range wireless device 30 may be configured to transmit data 46, while the short-range wireless scanner 44 may be configured to detect the transmitted data 46, represented as a signal, when in a broadcast area of the short-range wireless device 30. According to a method for connected work tool identification, the short-range wireless device 30 may be configured to transmit data 46 at a first signal strength, receive an indication from the movement detection device 40 that the work tool 26 is in a coupled configuration with the machine 10, change the first signal strength to a second signal strength in response to the indication, and set an active flag in the data 46 in response to the indication. The short-range wireless scanner 44 may be configured to detect short-range wireless devices in the surrounding area, detect the active flag in the data 46, and identify the work tool 26 as the connected work tool based in part on the active flag.

This method will be described in greater detail with reference to FIGS. 6, 7 and 8. As mentioned above, when the machine 10 picks up the work tool 26, the movement detection device 40 may detect movement or vibration, which may provide an indication that the work tool 26 is in a coupled configuration with the machine 10. In response to the indication, an active flag may be set in the data 46 that indicates the work tool 26 is "active," or coupled to a machine, rather than "inactive," or decoupled relative to a machine. That is, a field in the data 46 may be changed from "inactive" to "active" when movement of the work tool 26 is detected. This filters the number of work tools 26, 68, 70, 72, 74, 76 and 78 in proximity of each of the machines 10, 60, 62, 64 and 66, as the machines 10, 60, 62, 64 and 66 may be configured to only look for those of the work tools 26, 68, 70, 72, 74, 76 and 78 having an active flag.

Figure 6:
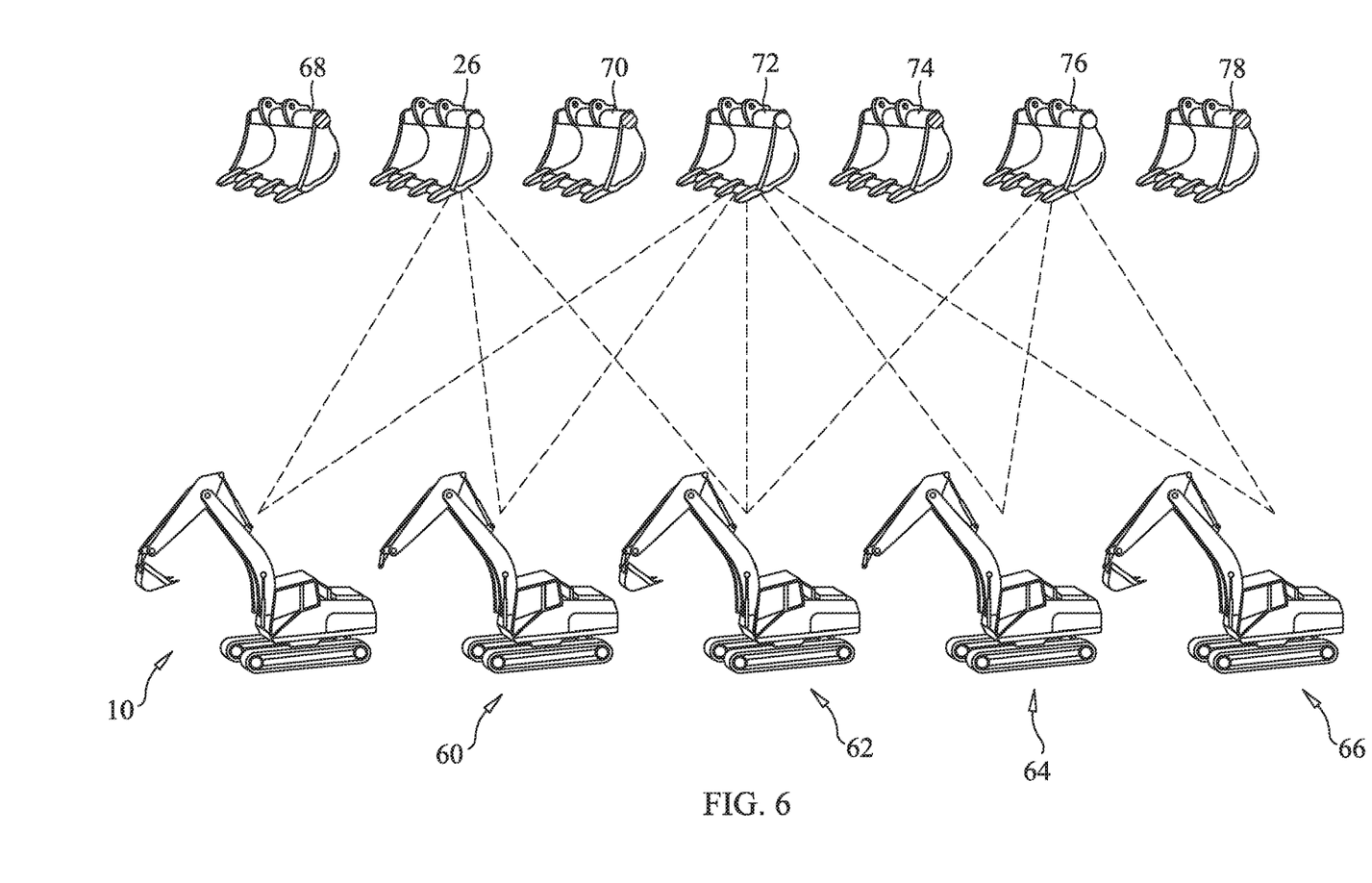
FIG. 6 is a diagrammatic view of a plurality of machines and a plurality of work tools, at a stage in a method of identifying a connected work tool using the short-range wireless system of FIG. 5, according to the present disclosure.

As shown in FIG. 6, for example, machines 10, 60, 62, 64 and 66 may be configured to detect only those of the proximate work tools 26, 68, 70, 72, 74, 76 and 78 that are "active." As such, machines 10 and 60 may detect work tools 26 and 72; machine 62 may detect work tools 26, 72 and 76; and machines 64 and 66 may detect work tools 72 and 76. As illustrated, there may be multiple "active" work tools 26, 72 and 76, in an area where there are multiple machines 10, 60, 62, 64 and 66 picking up one of the multiple work tools 26, 68, 70, 72, 74, 76 and 78.

If the "active" work tool 26, 72 and 76 is flagged as "active," the short-range data transmission component 38 of each "active" work tool 26, 72 and 76 may automatically reduce the transmission power to a level that will help isolate it from other work tools, such as work tools 68, 70, 74 and 78, that are also communicating wirelessly. For example, the processor 32 of each "active" work tool 26, 72 and 76 may reduce the first signal strength to a second signal strength, or a reduced signal strength, in response to the indication that the "active" work tool 26, 72 and 76 is in a coupled configuration. This reduces the number of "active" work tools 26, 72 and 76 in proximity of each of the machines 10, 60, 62, 64 and 66 as the range of the "active" work tools 26, 72 and 76 is reduced by reducing the transmission power.

Figure 7:
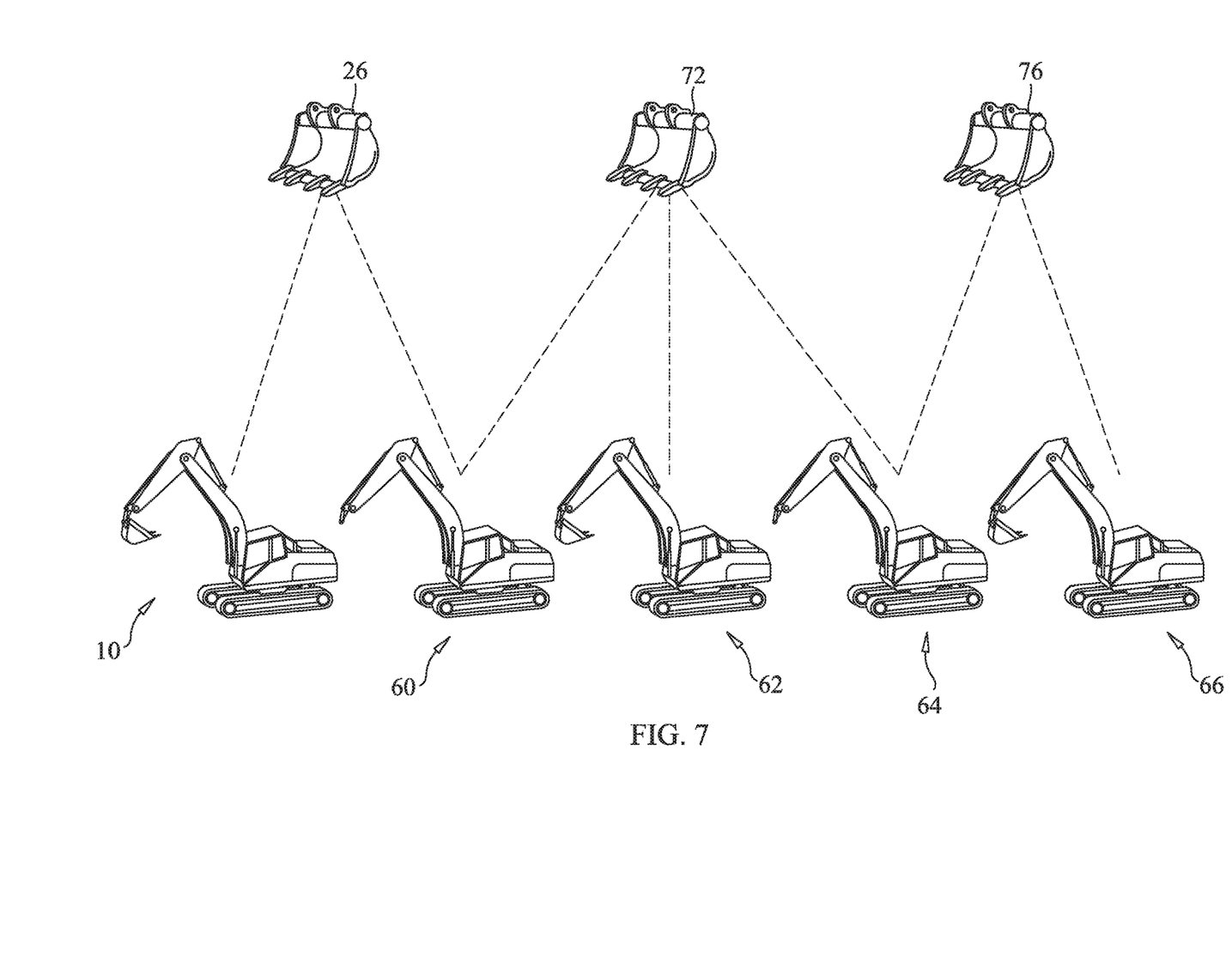
FIG. 7 is a diagrammatic view of the machines and a portion of the work tools of FIG. 6, at another stage in the method of identifying a connected work tool.

As illustrated in FIG. 7, the controller 48 of each of the "active" work tools 26, 72 and 76 may reduce the transmission power of the "active" work tools 26, 72 and 76. As a result, for example, machine 10 detects work tool 26; machine 60 detects work tools 26 and 72; machine 62 detects work tool 72; machine 64 detects work tools 72 and 76; and machine 66 detects work tool 68. As illustrated, there may still be a possibility of detecting more than one of the "active" work tools 26, 72 and 76.

Figure 8:
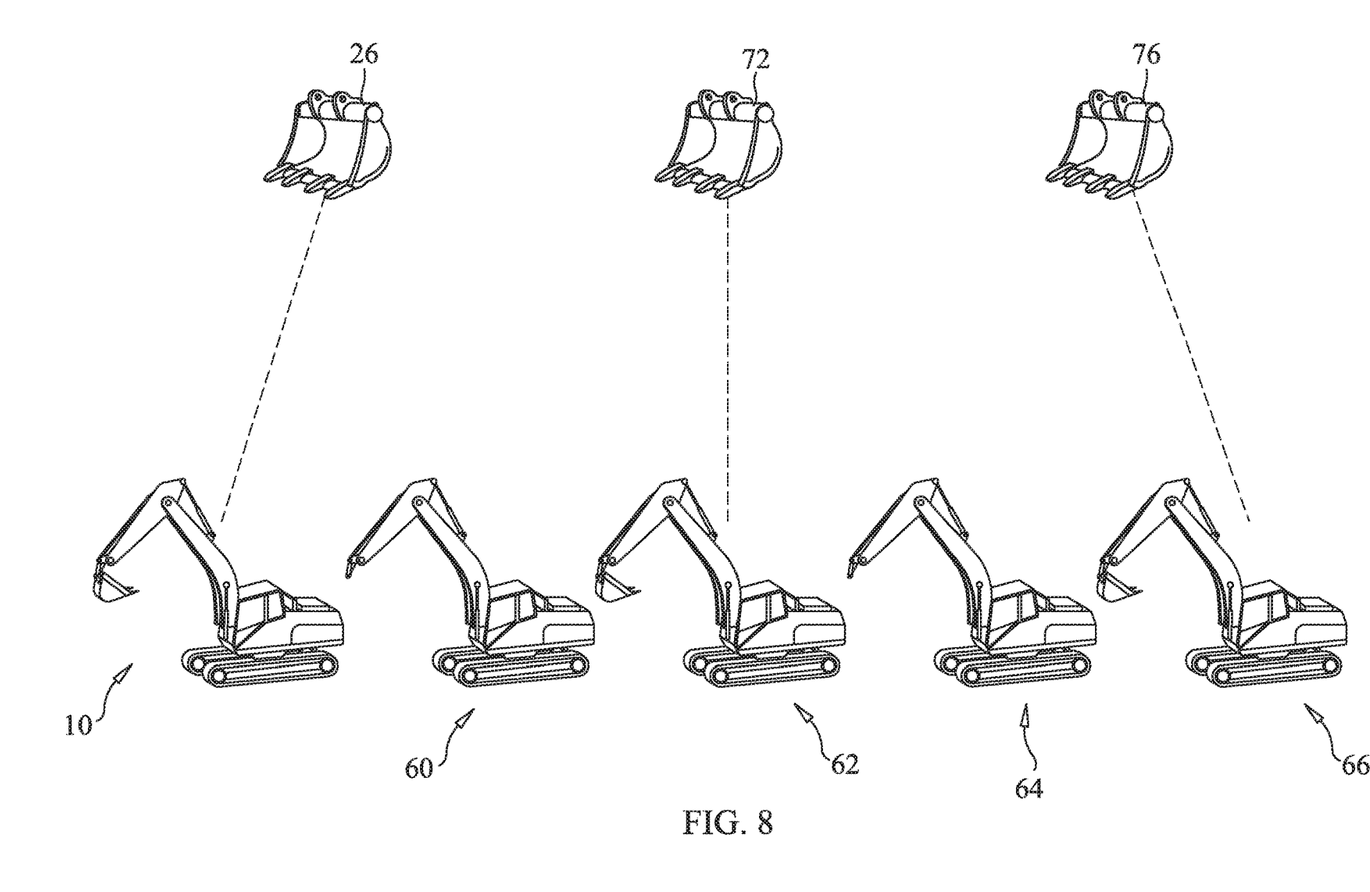
FIG. 8 illustrates another stage in the method of identifying a connected work tool.

Turning now to FIG. 8, the processor 32 of each of the "active" work tools 26, 72 and 76 may also include a timer 90, which may be hardware and/or software capable of measuring time, initiated in response to the indication of a coupled configuration and configured to measure lapsed time. Additionally, or alternatively, the timer 90 may begin to increment as soon as one of the work tools 26, 68, 70, 72, 74, 76 and 78 moves from an "inactive" to an "active" state. Essentially, the timer 90 may be configured to measure the amount of time that has passed since a work tool was picked up. When detecting more than one "active" work tool 26, 72 and 76, the short-range wireless scanner 44 and/or controller 48 of each of the machines 10, 60, 62, 64 and 66 may be configured to select the "active" work tool 26, 72 and 76 having the lowest amount of lapsed time as the connected work tool. That is, the "active" work tool 26, 72 and 76 most recently picked up will likely have the smallest amount of time that has lapsed, as indicated by the timer 90. As a result, machine 10 detects work tool 26; machine 62 detects work tool 72; and machine 66 detects work tool 76. More specifically, machine 10 may identify work tool 26 as the connected work tool.

In addition, the short-range wireless scanner 44 and/or controller 48 may be in communication with the operator display 50 of the machine 10 to allow an operator to confirm the selected work tool 26 as the connected work tool. If the machine 10 has a quick coupler 28, and stores a quick coupler attachment status indicative of an open coupler or a closed coupler, the short-range wireless scanner 44 and/or controller 48 may be configured to search for work tools only if the quick coupler attachment status has changed from indicating an open coupler to indicating a closed coupler. A closed coupler status may indicate a coupled configuration of a work tool with the machine 10.

INDUSTRIAL APPLICABILITY

The system and method for connected work tool identification described herein are applicable to a wide variety of machines and a wide variety of work tools that may be interchangeably coupled to the machines. Further, the system and method are applicable to short-range wireless systems including short-range wireless scanners of the machine and short-range wireless devices of the work tools.

Referring generally to FIGS. 1-8, an exemplary machine 10 includes an implement assembly 18 generally comprising a lift arm assembly 22, a tilt linkage 24, and a work tool 26. Although the work tool 26 is illustrated as a bucket, the machine 10 may support any of a variety of different work tools, such as, for example, blades, forks, and the like for performing various work operations. Since each of the variety of interchangeable work tools requires different parameters and control functions, multiple machine systems may require reconfiguration when a different work tool is attached to the machine 10. As a result, it may be beneficial to correctly and automatically identify the connected work tool.

Figure 9:
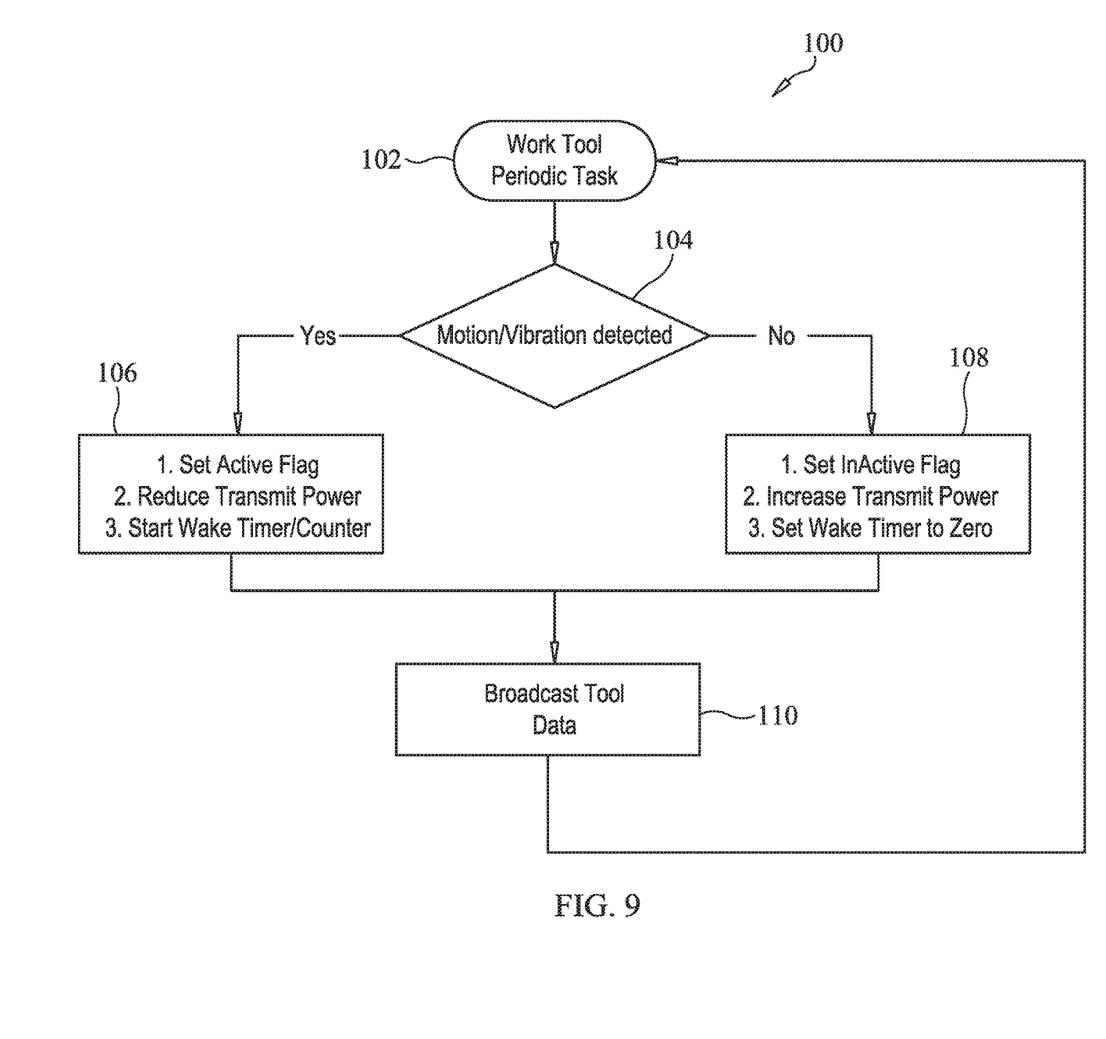
FIG. 9 is a flow diagram illustrating stages of an exemplary work tool configuration method, according to the present disclosure.

Turning now to FIG. 9, exemplary work tool configuration according to the connected work tool identification method will be described, with reference to a flow diagram 100. At box 102, the work tool 26 is available for performing a task, and is equipped with the short-range wireless device 30, which is configured to transmit device information, or data. If motion, or vibration, is detected by the movement detection device 40, at box 104, an active flag will be set in the device data, the transmission power will be reduced, and the timer 90 will be started (box 106). If motion is not detected, at box 104, an inactive flag will be set, the transmission power will be increased, and the timer 90 will be set to zero (box 108). At box 110, work tool data is broadcasted at the selected transmission power.

Figure 10:
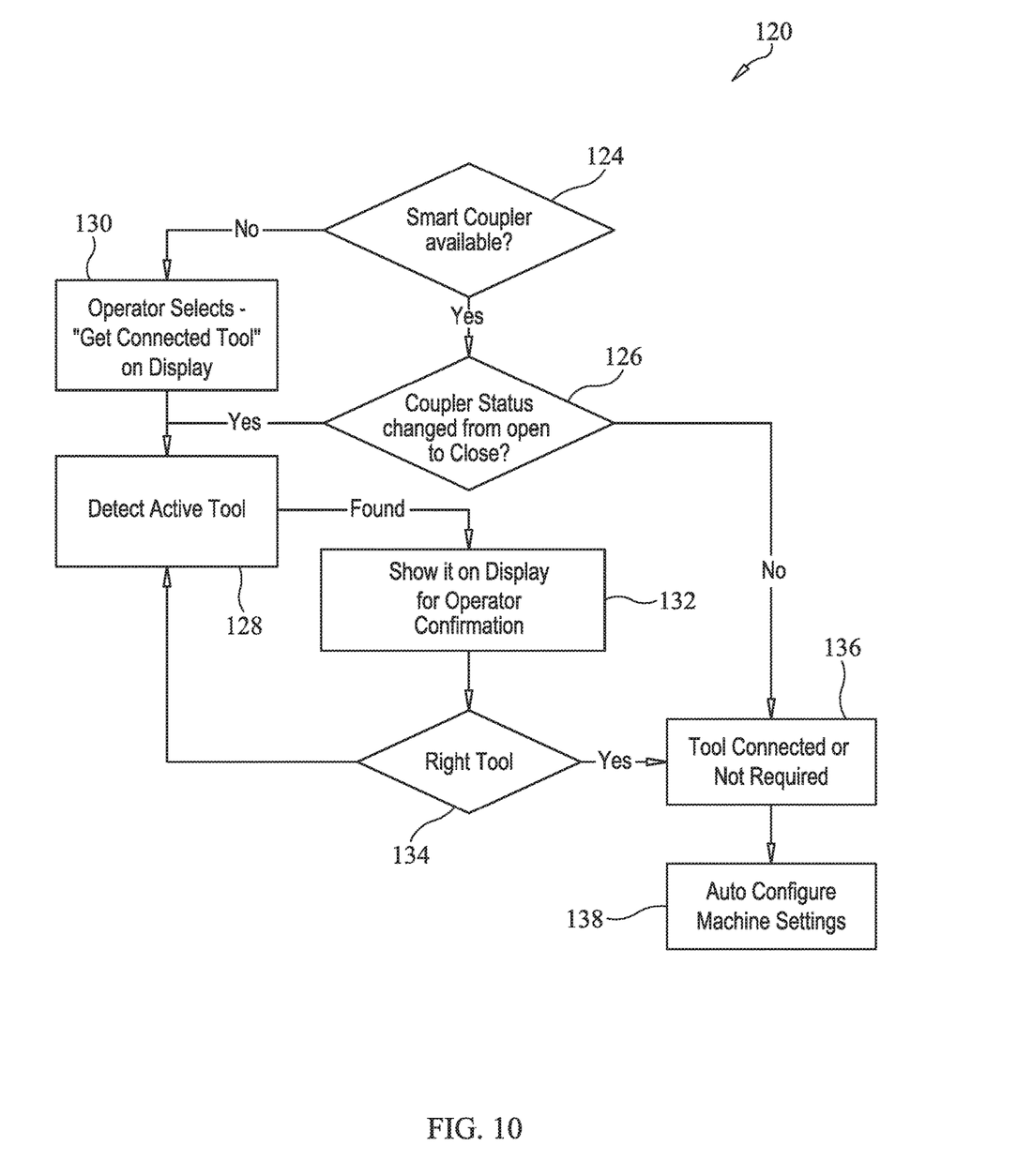
FIG. 10 is a flow diagram illustrating stages of an exemplary machine configuration method, according to the present disclosure.

In FIG. 10, machine configuration according to the connected work tool identification method described herein will be described, with reference to a flow diagram 120. At box 124, the system determines if a quick coupler 28 is used or available on the machine 10. If yes, at box 126, it is determined whether the quick coupler attachment status has changed from being indicative of an open coupler to being indicative of a closed coupler. If it has changed from being indicative of an open coupler to being indicative of a closed coupler, the system attempts to detect the active tool, at box 128.

If a quick coupler 28 is not used or available, at box 124, the operator may select "get connected work tool" on the operator display 50, at box 130. At box 128, the system may attempt to find the connected work tool, as described herein, and, when a work tool has been identified, such as work tool 26, it is provided on the operator display 50 for operator confirmation, at box 132. If it is not the correct tool, at box 134, the system may attempt again to identify the connected work tool. Otherwise, it is determined that the connected work tool is identified or the information is not required, at box 136. At box 138, machine settings may be auto-configured based on the connected work tool.

Figure 11:
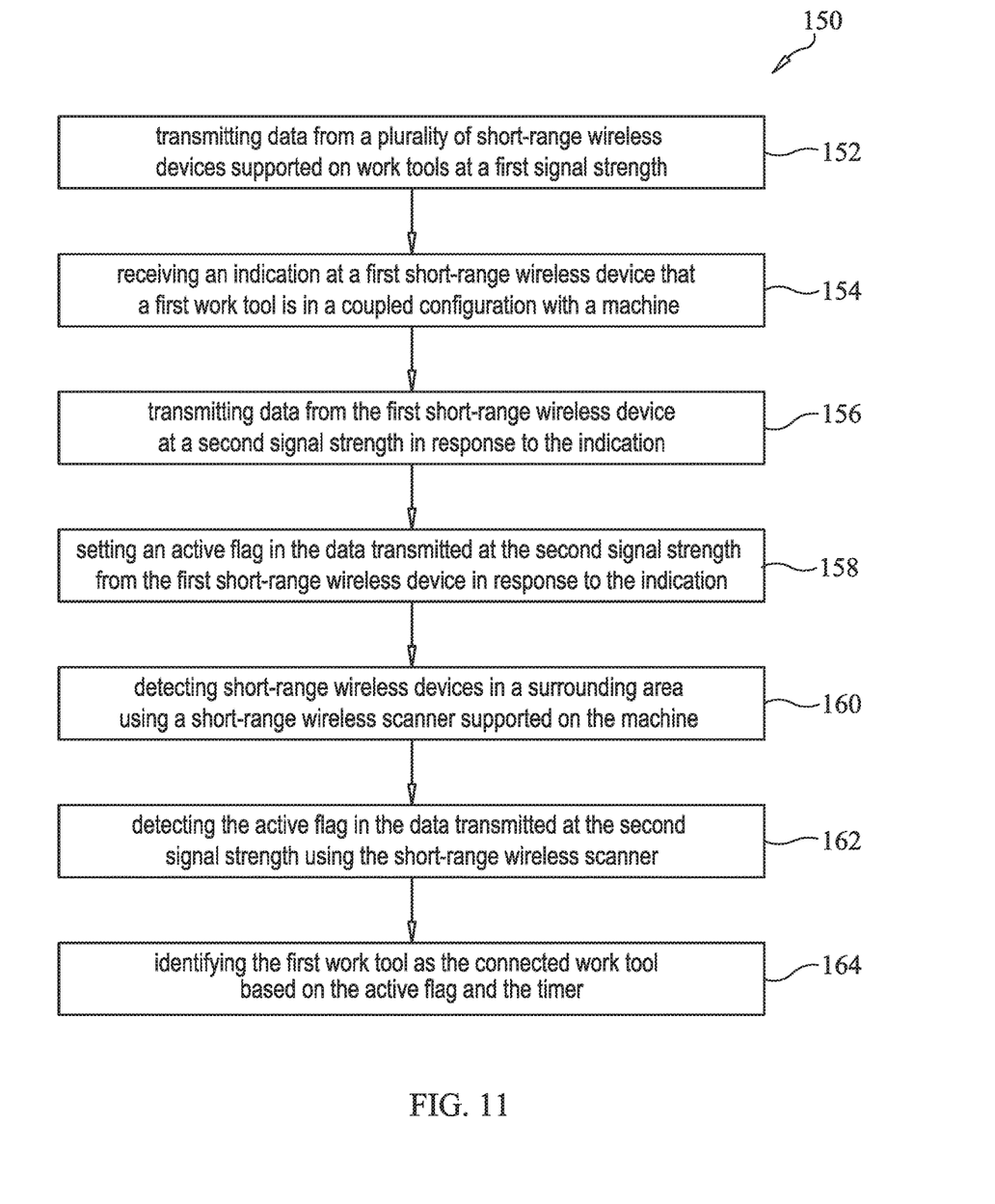
FIG. 11 is a flow diagram illustrating stages of an exemplary method of identifying a connected work tool, according to the present disclosure.

An exemplary method of connected work tool identification is shown in a flow diagram 150 in FIG. 11. At box 152, data is transmitted from a plurality of short-range wireless devices 30 supported on work tools at a first signal strength. At box 154, an indication is received at a first short-range wireless device 30 that a first work tool 26 is in a coupled configuration with the machine 10. For example, a movement detection device 40 may detect acceleration that occurs when the work tool 26 is picked up by the machine 10. Data is then transmitted from the first short-range wireless device 30 at a second signal strength in response to the indication, at box 156. In addition, at box 158, an active flag in the data transmitted at the second signal strength from the first short-range wireless device 30 is set in response to the indication.

At box 160, a short-range wireless scanner 44 supported on the machine 10 detects short-range wireless devices 30 in a surrounding area. The short-range wireless scanner 44 detects the active flag in the data transmitted at the second signal strength, at box 162, and identifies the first work tool 26 as the connected work tool based on the active flag, at box 164. If multiple work tools are "active," both the active flag and the timer 90, indicating the amount of time the work tool has been "active," are used to determine the connected work tool. When multiple machines are nearby with work tools, it can be difficult to determine which work tool a machine picks up. The strategies described herein can increase the likelihood that the connected work tool will be correctly identified.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A short-range wireless device, comprising:
a short-range data transmission component transmitting data at a first signal strength;
a movement detection device providing an indication that a work tool supporting the short-range wireless device is in a coupled configuration with a machine;
a processor reducing the first signal strength to a second signal strength in response to the indication;
the short-range data transmission component transmitting data at the second signal strength.

2. The short-range wireless device of claim 1, wherein the processor is configured to set an active flag in the data transmitted at the second signal strength in response to the indication.

3. The short-range wireless device of claim 2, further comprising a timer initiated in response to the indication and configured to measure lapsed time.

4. The short-range wireless device of claim 1, further comprising a timer initiated in response to the indication and configured to measure lapsed time.

5. The short-range wireless device of claim 4, wherein the processor is configured to set an active flag in the data transmitted at the second signal strength in response to the indication.

6. The short-range wireless device of claim 1, wherein the movement detection device is an accelerometer.

7. The short-range wireless device of claim 1, wherein the movement detection device includes at least one of an accelerometer, a gyro sensor, and a barometer.

8. The short-range wireless device of claim 1, wherein the short-range data transmission component has a broadcast range between about 0 feet and 230 feet.

9. A short-range wireless system, comprising:
a short-range wireless device of a work tool configured to:
transmit data at a first signal strength,
receive an indication that the work tool is in a coupled configuration with a machine,
transmit data at a second signal strength in response to the indication, and
set an active flag in the data transmitted at the second signal strength; and
a short-range wireless scanner located at a machine and configured to:
detect short-range wireless devices in a surrounding area,
detect the active flag in the data transmitted at the second signal strength, and
identify the work tool as a connected work tool based in part on the active flag.

10. The short-range wireless system of claim 9, wherein the second signal strength is reduced relative to the first signal strength.

11. The short-range wireless system of claim 10, wherein the short-range wireless device includes an accelerometer for providing the indication that the work tool is in the coupled configuration.

12. The short-range wireless system of claim 10, wherein the short-range wireless device is configured to set the active flag based on the indication.

13. The short-range wireless system of claim 12, wherein:
the short-range wireless device includes a timer initiated in response to the indication and configured to measure lapsed time; and
the short-range wireless scanner is configured to identify the work tool as the connected work tool based on the active flag and the lapsed time.

14. The short-range wireless system of claim 12, wherein:
a controller of the machine stores a quick coupler attachment status indicative of an open coupler or a closed coupler; and
the short-range wireless scanner detects short-range wireless devices in the surrounding area only if the quick coupler attachment status is indicative of the closed coupler.

15. A method for connected work tool identification, the method including:
transmitting data from a plurality of short-range wireless devices at a first signal strength, with each of the plurality of short-range wireless devices supported on one of a plurality of work tools;
receiving an indication at a first short-range wireless device of the plurality of short-range wireless devices that a first work tool supporting the first short-range wireless device is in a coupled configuration with a machine;
transmitting data from the first short-range wireless device at a second signal strength in response to the indication;
setting an active flag in the data transmitted at the second signal strength from the first short-range wireless device in response to the indication;
detecting short-range wireless devices in a surrounding area using a short-range wireless scanner located at the machine;
detecting the active flag in the data transmitted at the second signal strength using the short-range wireless scanner; and
identifying the first work tool as a connected work tool of the machine based in part on the active flag.

16. The method of claim 15, wherein transmitting data from the first short-range wireless device includes reducing the first signal strength to the second signal strength.

17. The method of claim 16, further including:
initiating a timer of the first short-range wireless device to measure lapsed time in response to the indication; and
identifying the first work tool as the connected work tool based on the active flag and the lapsed time.

18. The method of claim 15, further including:
storing a quick coupler attachment status at a controller of the machine indicative of an open coupler or a closed coupler; and
detecting short-range wireless devices in the surrounding area only if the quick coupler attachment status is indicative of the closed coupler.

19. The method of claim 15, wherein a controller of the machine identifies the first work tool as the connected work tool.

20. The method of claim 15, wherein the first short-range wireless device includes an accelerometer for providing the indication that the first work tool is in the coupled configuration.

* * * * *